Nov. 17, 1953 B. C. FLEMING-WILLIAMS ET AL 2,659,816
NONSINUSOIDAL AMPLIFIER
Filed March 7, 1947

INVENTORS
Brian C. Fleming-Williams
Henry Ashford Wynn
BY
Ralph B. Stewart
ATTORNEY Patented Nov. 17, 1953

2,659,816

UNITED STATES PATENT OFFICE 2,659,816

NONSINUSOIDAL AMPLIFIER

Brian Clifford Fleming-Williams and Arthur Henry Ashford Wynn, London, England, assignors to A. C. Cossor Limited, London, England, a British company Application March 7, 1947, Serial No. 733,154

Claims priority, application Great Britain March 7, 1946

2 Claims. (Cl. 250—27)

This invention relates to thermionic discharge device circuits.

In known amplifier circuits suitable for the amplification of high-frequency voltages that are sinusoidal in shape it is usual to increase the impedance in the anode circuit of a discharge device or valve by the provision of inductance shunting the stray capacitance with respect to cathode or earth of the valve anode and its associated wiring; this inductance being of such a value that the impedance of the capacitance-inductance combination is very high at the frequency being amplified. The presence of a very high impedance in the anode circuit enables a high voltage-amplification to be obtained; but this is so only for a single frequency or an extremely narrow band of frequencies. On the other hand, when a non-sinusoidal recurrent voltage is to be amplified it is the usual practice to have an aperiodic load in the anode circuit, and in this case the limitation put upon the dynamic impedance of the anode circuit by the existence of the stray capacitances cannot be avoided. The present invention is concerned with removing or lessening the significance of this limitation, in a sense doing for a non-sinusoidal amplifier what has already been done for a sinusoidal amplifier.

In an embodiment of the invention as applied to a thermionic valve circuit, the stray capacitances of a valve are shunted by a lumped delay line which is of such a value that the impedance of the capacitance-line combination is very high at the input end. With the stray capacitance so shunted the impedance of the combination is high for a frequency which is the reciprocal of twice the delay of the line, and also for all harmonics of this frequency up to the cut-off frequency of the line. This is true when both ends of the line are short circuited.

Figure 1:
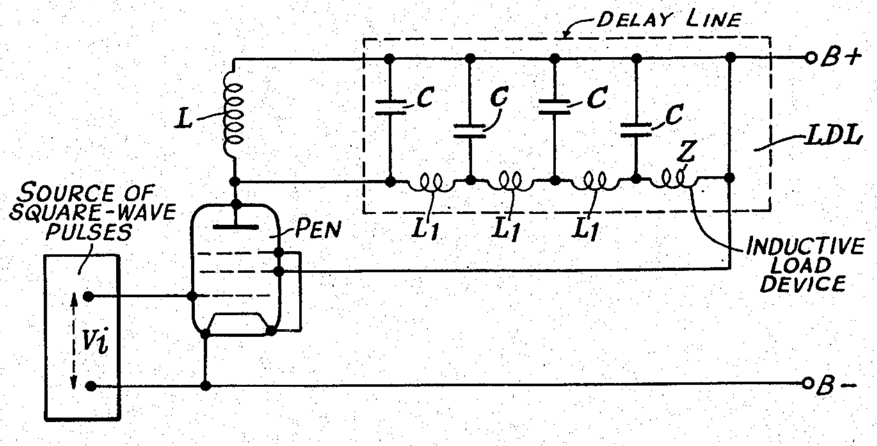
Figure 2:
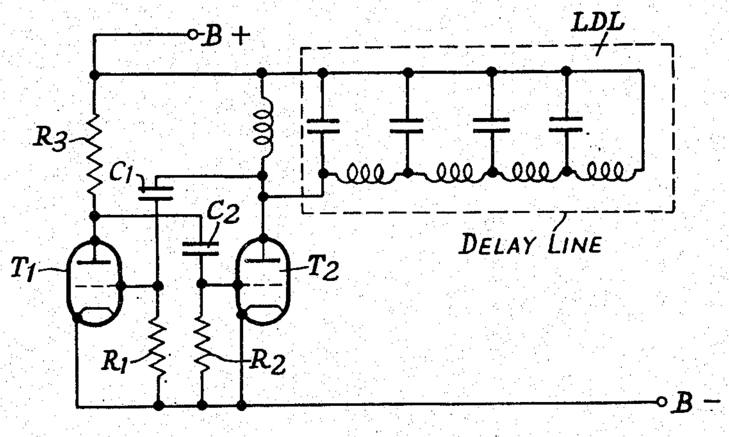

Embodiments of the invention will now be described with reference to the drawing accompanying this specification in which Figure 1 shows a circuit diagram of the invention embodied in what may be called an integrating current amplifier; and Figure 2 shows a circuit diagram of the invention embodied in a self oscillator of the multivibrator type.

Figure 1 shows what may be called an integrating current amplifier, meaning by this term a circuit such that from a square-wave voltage input is derived a saw-tooth current output of substantial amplitude. A pentode tube or valve PEN is provided with an anode load consisting of a coil L across which is connected the closed-ended lumped delay line LDL formed of a network of series inductance coils L′ and shunt condensers C. Inasmuch as the lumped delay line LDL is at one end connected between the anode of valve PEN and the high-tension supply, and this high tension supply may be regarded as of negligible impedance in respect of the high-frequency alternating voltages being dealt with by the circuit, the lumped delay line LDL may be described as being connected at said end between anode and cathode of valve PEN. In the circuit, if a square wave voltage $V_i$ is applied to the grid of the valve, a similar voltage not necessarily of the same amplitude will appear at the anode but the current through the end section of the line will be substantially a saw-tooth. Owing to the storage principle, the maximum current through this end coil Z, may be many times the maximum valve current (equivalent to circulating current in tuned circuit). This last section Z may be the deflector coils for a cathode ray tube. Then by this means high currents may be built up without very high voltages being attained across the valve.

In the above case a transformer-like action may be obtained by tapping in the valve further up the line. Then the impedance across the valve is increased.

As with all amplifiers such a circuit can be made into a self oscillator. In this case the method of applying the positive feedback can be made to determine the wave form. Thus a simple multivibrator circuit for obtaining a saw-tooth current wave form is shown in Figure 2.

This is a multivibrator circuit in which the anode load of one of the valves consists of the coil L and closed-ended lumped delay line LDL of Figure 1. The gain round the whole circuit will only be substantial at a frequency which is the reciprocal of twice the delay time of the line and at harmonics thereof. The circuit oscillates at this frequency but the output which may be taken from the anode of either valve is rich in harmonics, as is known to be the case with an ordinary multivibrator; the fundamental frequency is, however, in this case accurately controlled by the delay line. The resistor R3 may also be replaced by a coil and delay line. At high recurrence rates the gain round the circuit is much higher than can be reasonably obtained using an ordinary multivibrator as the effective load impedance can be made much higher than is possible without the delay line. It thus oscillates more vigorously at high recurrence rates and generates a waveform with a higher harmonic content than more conventional circuits.

If R2, C2 is made to have a short time constant with respect to the required recurrence rate, then this will determine the flyback time. The combination R1, C1 should have a time constant considerably longer than this, and then the rate of recurrence will be determined by the constants of the line.

In both figures of the drawing, the coils L and Z serve the same function in the delay line as coils L', and it will be noted that both ends of the line are terminated with short-circuits or terminations of substantially short-circuit impedance.

We claim:

1. A circuit for generating a saw-tooth wave from square-wave pulses comprising, in combination, a source of square-wave pulses, a delay line having a delay equal to the reciprocal of twice the repetition frequency of said square-wave pulses and formed of a network of series inductance coils and shunt condensers, inductance means terminating said delay line at each end in a termination having substantially short-circuit impedance, an electron tube amplifier having an anode, a cathode and at least one control electrode, an input circuit for applying square-wave pulses from said source to said grid, and a connection from said anode to said delay line for applying amplified square-wave pulses to one of said inductances adjacent one end of said line, whereby saw-tooth current is supplied to the terminal inductance at the other end of said line.

2. A circuit for energizing an inductive load device with sawtooth pulses in response to square-top pulses comprising, in combination, an inductive load device, a source of square-top pulses, an electron tube having an anode, a cathode, and at least one control grid, an input circuit for applying square-top pulses from said source to said control grid, a source of anode current, an inductive impedance connecting said anode with said source, a delay line having a delay equal to the reciprocal of twice the repetition frequency of said square-top pulses and formed of a plurality of sections each being formed of a series inductance coil and a shunt condenser, one end of said line being connected across said inductive impedance and the other end thereof being connected to supply current to said load device, said inductive impedance and said load device constituting inductive elements of said line and providing, in effect, terminations of substantially zero impedance, whereby multiple reflections are produced in said line.

BRIAN CLIFFORD FLEMING-WILLIAMS.
ARTHUR HENRY ASHFORD WYNN.

References Cited in the file of this patent

UNITED STATES PATENTS

| Number | Name | Date |
|---|---|---|
| 1,830,238 | Nukiyama | Nov. 3, 1931 |
| 2,266,154 | Blumlien | Dec. 16, 1941 |
| 2,419,882 | Bradley | Apr. 29, 1947 |

FOREIGN PATENTS

| Number | Country | Date |
|---|---|---|
| 530,956 | Great Britain | Dec. 24, 1940 |